United States Patent Office 3,357,625
Patented Dec. 12, 1967

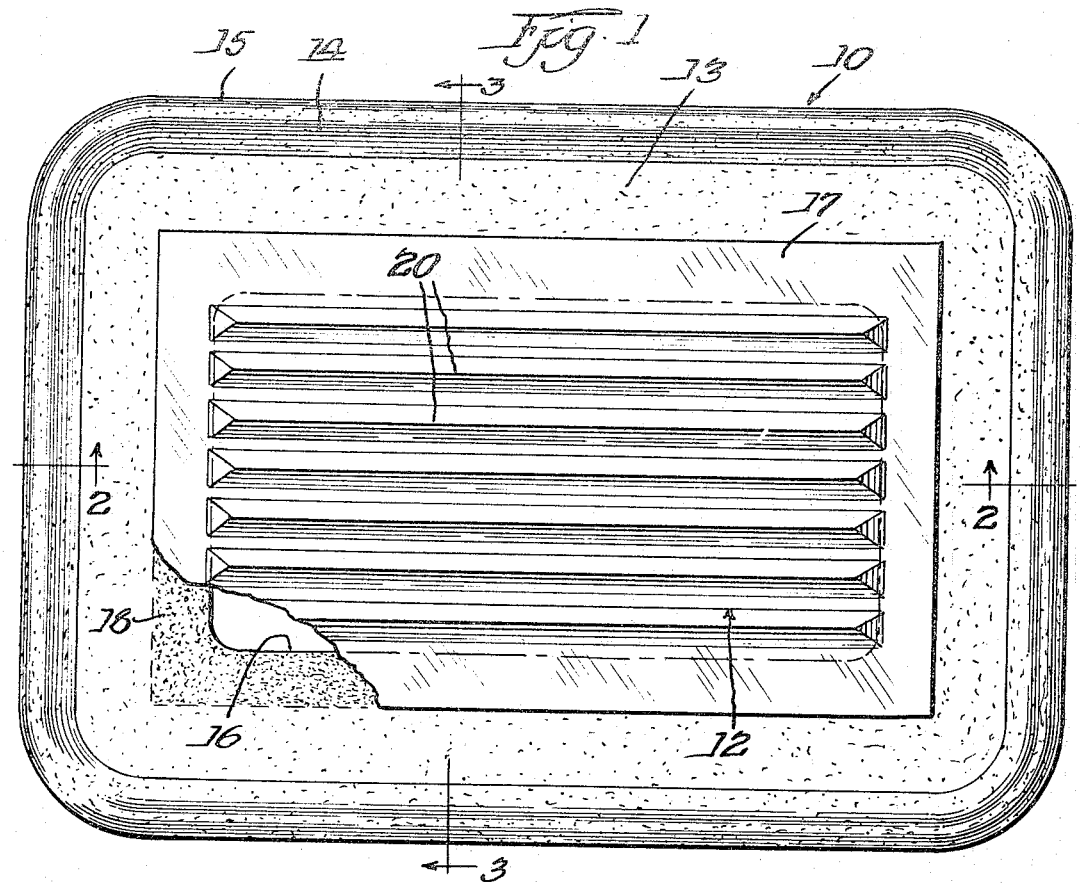
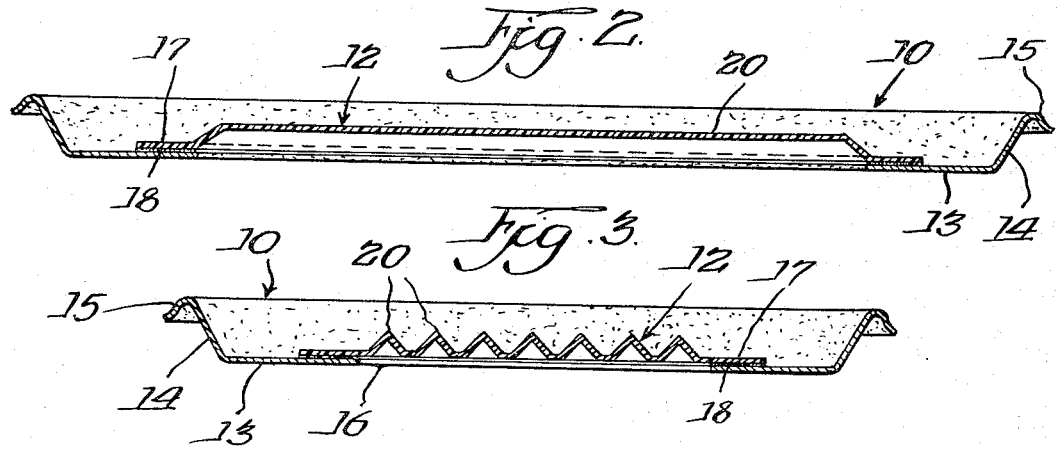

3,357,625
MEAT TRAY WITH WINDOW
George V. Malmgren, Chicago, Ill., assignor to Malanco, Inc., Blue Island, Ill., a corporation of Illinois
Filed June 7, 1966, Ser. No. 555,741
4 Claims. (Cl. 229—2.5)

ABSTRACT OF THE DISCLOSURE

The tray of the invention is primarily designed for displaying meats and the like, and accordingly the said tray which is formed of pulpwood has a transparent plastic window in the bottom wall thereof. The pulpwood portion of the tray has the ability to absorb and soak up the meat juices, whereas the plastic window which gives the desired visibility is longitudinally corrugated to provide channels for flowing the meat juices to the peripheral ends of the tray.

---

The invention relates to trays of the display variety for containing and displaying meats and the like, and has reference in particular to a meat tray formed of pulpwood and having a transparent plastic window in the bottom wall thereof.

When trays for displaying meat and the like are formed of pulpwood they have the ability to absorb and soak up the liquids, such as the meat juices, which drain from the meat. This is a desirable characteristic for such trays. However, the purchaser when inspecting the meat on such trays cannot see the underside and accordingly trays of clear plastic have been used in an attempt to overcome this difficulty. However, these plastic trays, although providing visibility, are not entirely satisfactory since the meat juices are are not absorbed by the plastic of the tray.

Accordingly an object of the present invention is to provide a meat tray formed of pulpwood and having a transparent plastic window in the bottom wall thereof so that the pulpwood part of the tray will soak up the meat juices, whereas the plastic window will give the desired visibility.

Another object is to provide a pulpwood meat tray having a clear plastic window in its bottom wall and wherein the plastic window is corrugated so as to provide channels for flowing the meat juices to the pulpwood part of the tray. The corrugations of the plastic window also have the effect of strengthening and increasing the rigidity of the tray.

With these and various other objects in view, the invention may consist of certain novel features of construction and operation, as will be more fully described and particularly pointed out in the specification, drawings and claims appended thereto.

In the drawings which illustrate an embodiment of the meat tray of the invention and wherein like reference characters are used to designate like parts—

FIGURE 1 is a top view in plan looking down on the tray of FIGURE 2, and which shows the central location of the plastic window in the bottom wall of the tray;

FIGURE 2 is a longitudinal sectional view taken substantially on line 2—2 of FIGURE 1; and FIGURE 3 is a transverse sectional view taken substantially on line 3—3 of FIGURE 1.

The embodiment selected for illustrating the present invention is shown in FIGURE 1 wherein the meat tray 10 is principally formed of pulpwood and is provided with a transparent plastic window 12 in its bottom wall. Only the peripheral portion of the tray is formed of conventional pulp board which is relatively soft and highly absorbent. The said peripheral portion includes the bottom wall part 13, the upward and outwardly sloping side walls 14 and the downturned rim 15. The bottom wall 13 is flat throughout its extent and the side walls 14 extend upwardly and outwardly therefrom on all four sides. The downturned rim 15 adds to the appearance of the tray, and in addition the rim strengthens and increases the rigidity of the tray.

In accordance with the invention an opening 16 is provided in the bottom wall part 13 and said opening is preferably centrally located and generally rectangular in shape. The opening is closed by the transparent window 12 which is adhesively secured to the top surface of the bottom wall. The window 12 is formed of any suitable plastic having the desired characteristics of being transparent and relatively strong. Polystyrene is one plastic which has been found to be entirely satisfactory.

The plastic of the window has an overall size somewhat in excess of the size of the opening 16 so that the flat rim 17 of the window overlaps the bottom wall around the periphery of the opening. The overlapping areas are indicated by the numeral 18 and the plastic window is adhesively secured to the bottom wall at said overlapping areas. The plastic window is preferably corrugated, with the corrugations 20 running longitudinally of the tray. The valleys formed between adjacent corrugations are open at each end. Thus the valleys help to flow the meat juices to the periphery of the tray so that the pulpwood of the peripheral portion can absorb the juices. The corrugations have the additional and desirable effect of strengthening the tray, since they materially increase the rigidity of the bottom wall.

It will be understood that the plastic window of the present tray is adhesively secured to the bottom wall of the pulpwood section in a manner whereby the overlapping parts are sealed and thus the liquids such as the meat juices are prevented from leaking. The transparent window permits the intended purchaser to view the bottom of the contents of the tray, whereas the ridges or corrugations permit the liquids to flow in either direction to the pulpwood part so as to be absorbed thereby. The combination of the pulpwood and the plastic window provides a tray that is much more rigid than a tray made entirely of polystyrene plastic.

The invention is not to be limited to or by details of construction of the particular embodiment thereof illustrated by the drawings as various other forms of the device will, of course, be apparent to those skilled in the art without departing from the spirit of the invention or the scope of the claims.

What is claimed is:

1. In a tray for displaying meat and the like, a main body portion formed of absorbent pulp board and including a flat bottom wall part having upwardly and outwardly extending side walls, said bottom wall part having an opening therein, and a transparent window closing said opening and being adhesively secured to the bottom wall part, said window being formed by a clear plastic and having corrugations therein which provide valleys between adjacent corrugations.

2. In a tray for displaying meat and the like, a main body portion formed of absorbent pulp board and including a flat bottom wall part, side walls integral with the bottom wall part and extending upwardly and outwardly on all four sides, said bottom wall part having an opening therein, a transparent window closing said opening and being adhesively secured to the bottom wall part around the periphery of the opening, said window being formed of a clear plastic and having corrugations therein which provide valleys between adjacent corrugations that are open at each end.

3. In a tray for displaying meat and the like as defined by claim 2, wherein the clear plastic window is adhesively secured to the bottom part on the top side of the tray.

4. In a tray for displaying meat and the like as defined by claim 2, wherein the pulp board of the body portion additionally includes a downturned rim which is integral with the upwardly and outwardly extending side walls, and wherein the clear plastic window is adhesively secured to the bottom part on the top side of the tray.

References Cited

UNITED STATES PATENTS

| | | | |
|---|---|---|---|
| 2,918,379 | 12/1959 | Lurie | 220—72 X |
| 2,996,236 | 8/1961 | Barr | 229—87 |
| 3,185,371 | 5/1965 | Reifers | 229—2.5 |

DAVID BOCKENEK, *Primary Examiner.*